United States Patent
Heuft et al.

(10) Patent No.: US 6,588,575 B1
(45) Date of Patent: Jul. 8, 2003

(54) DEVICE FOR SINGLING OUT ARTICLES FROM A FLOW OF SUCH ARTICLES

(75) Inventors: Bernhard Heuft, Burgbrohl (DE); Gerd Kristandt, Worms (DE)

(73) Assignee: Heuft Systemtechnik GmbH, Burgbrohl (DE)

(*) Notice: Subject to any disclaimer, the term of this patent is extended or adjusted under 35 U.S.C. 154(b) by 0 days.

(21) Appl. No.: 10/030,746

(22) PCT Filed: May 5, 2000

(86) PCT No.: PCT/EP00/04039

§ 371 (c)(1),
(2), (4) Date: Nov. 1, 2001

(87) PCT Pub. No.: WO00/68120

PCT Pub. Date: Nov. 16, 2000

(30) Foreign Application Priority Data

May 5, 1999 (DE) .................................. 299 08 036 U

(51) Int. Cl.[7] .............................................. B65G 47/10
(52) U.S. Cl. ............. 198/370.07; 198/598; 198/457.07
(58) Field of Search ........................ 198/598, 457.07, 198/370.07, 468.1

(56) References Cited

U.S. PATENT DOCUMENTS

| | | | | |
|---|---|---|---|---|
| 4,474,295 A | * | 10/1984 | Braschos | 209/653 |
| 4,564,105 A | * | 1/1986 | Brouwer et al. | 198/457.07 |
| 4,850,470 A | * | 7/1989 | Ferkany | 198/345.3 |
| 5,010,998 A | * | 4/1991 | MacMillan | 198/370.07 |
| 5,060,783 A | * | 10/1991 | Chenevard et al. | 198/434 |
| 5,464,088 A | * | 11/1995 | Koerber | 198/370.07 |
| 5,509,537 A | * | 4/1996 | Crismon et al. | 209/577 |
| 6,328,152 B1 | * | 12/2001 | Focke et al. | 198/468.1 |

FOREIGN PATENT DOCUMENTS

| | | |
|---|---|---|
| DE | 24 22 366 | 11/1975 |
| DE | 24 10 589 | 3/1977 |
| DE | 20 14 531 A | 8/1979 |
| DE | 34 26 713 C2 | 1/1986 |
| DE | 3623327 A | 1/1988 |
| DE | 94 05 706 U | 5/1995 |

OTHER PUBLICATIONS

A copy of an International Preliminary Examination Report established of international patent application No. PCT/EP00/04039.

* cited by examiner

Primary Examiner—Christopher P. Ellis
Assistant Examiner—Richard Ridley
(74) Attorney, Agent, or Firm—Gardner Carton & Douglas LLC

(57) ABSTRACT

The device (20) for diverting individual items from a stream of items which are conveyed on a transport apparatus has an extendable and retractable diversion element (22), which is operated via a gear unit (26, 28, 30, 32, 34) by a drive apparatus moving or swinging to and fro and is precisely time-controllable, in order to impart a cross impulse to items to be diverted so that they slide from the transport apparatus (11) across the direction of transport. The diversion element (22) carries out a complete extension and retraction movement during a single to-or-fro movement or swing of the drive apparatus. The drive apparatus moving to and fro can be a pneumatic cylinder (42), and the gear unit which transmits the piston movement to the diversion element (22) can be a coulisse link mechanism (26, 28, 30, 32, 34) or a toggle lever.

10 Claims, 9 Drawing Sheets

DEVICE FOR SINGLING OUT ARTICLES FROM A FLOW OF SUCH ARTICLES

DESCRIPTION

Figure 1:
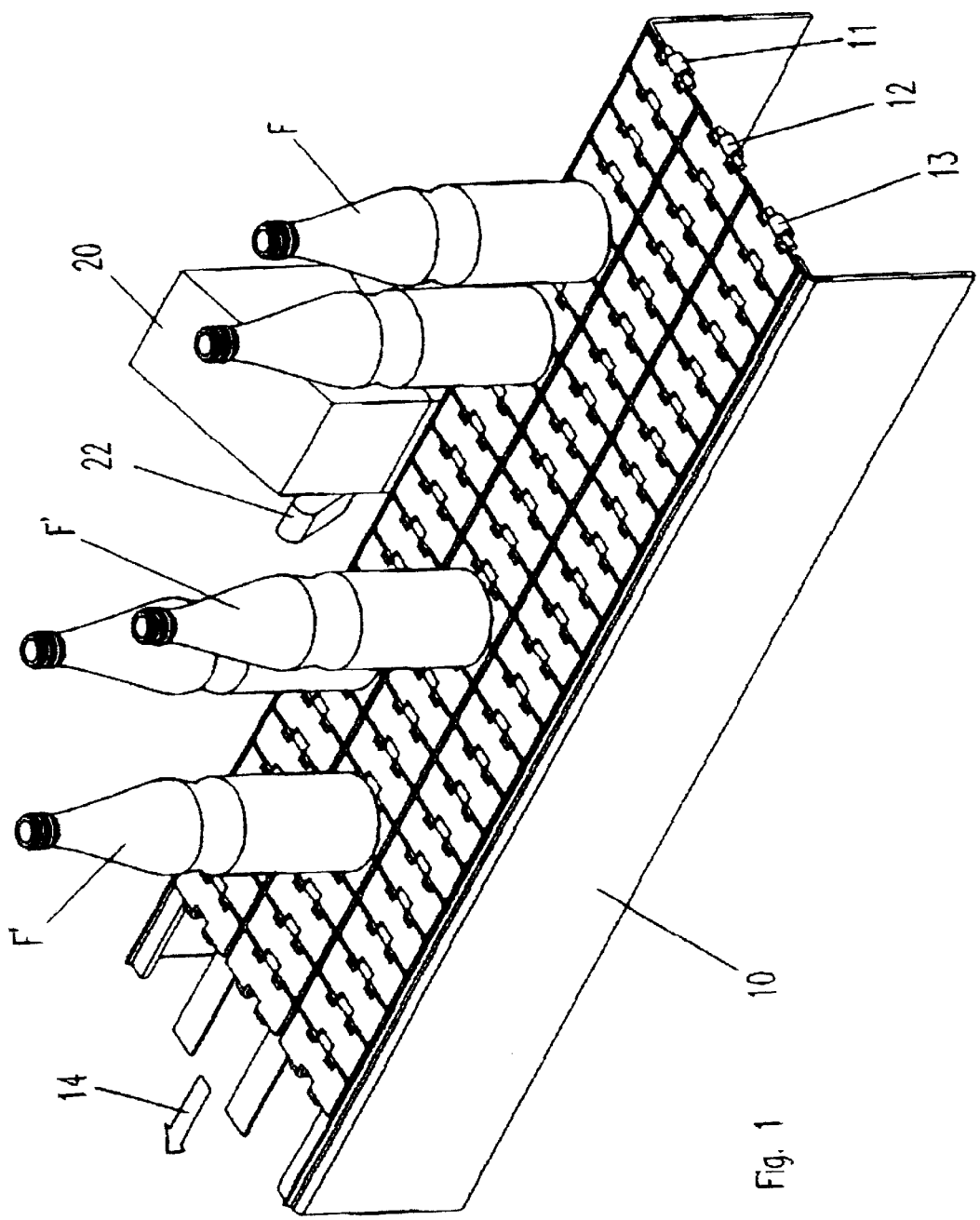

The invention relates to a device for diverting individual items from a stream of items which are conveyed on a transport apparatus. The device contains an extendable and retractable diversion element which is precisely time-controllable in order to impart a cross impulse to the items to be diverted so that they slide from the transport apparatus across the direction of transport. The diversion element is operated via a gear unit by a drive apparatus moving or swinging to and fro, e.g. by a piston-cylinder unit or a stepped motor oscillating to and fro.

Such diversion devices are used e.g. for sorting out defective drinks bottles or other empty or already-filled food containers or packages. The transport apparatuses are conveyor belts, link chain conveyors or similar, two or more such conveyors running parallel to one another and the diversion device being intended to move the defective bottles or containers from a first conveyor to the conveyor or one of the conveyors running alongside.

Diversion devices with a striker which is operated by a pneumatic cylinder are known from DE-A-36 23 327. The pneumatic cylinder and the striker can be swivellable so that the striker, during impact with the containers, moves along with the latter. This is intended to avoid the striker braking the containers.

A diversion element in the form of a striker operated by a cam is known from DE-C1-37 34 599. A cam segment for driving a striker is known from DE-A-39 17 541.

It is known from DE-C1-38 32 408 to arrange for the pneumatic cylinder to act on a triangular push rod which is rotatable about a housing-fixed pivot and to thereby accelerate an element transmitting the cross impulse.

Disk-shaped self-rotating diversion elements with spiral-shaped diversion segments on the circumference are known from DE-C1-37 22 515. The diversion segments can be comprised of brushes.

With diversion apparatuses, it is always required on the one hand to allow as high a speed of the transport apparatus as possible and on the other hand to divert the items so gently that there is no danger of their falling over. They are also to function reliably even if the items are travelling closely spaced or in immediate succession.

The object of the invention is to make possible higher throughput rates of the items without the items falling over, and to allow small spaces between the items.

This object is achieved according to the invention in that the diversion element carries out a complete extension and retraction movement during a single to-or-fro movement or swing of the drive apparatus.

If the drive apparatus is a pneumatic cylinder for example, and the piston is extended during a diversion process, it retracts again during the next diversion process and vice versa. If the piston is extended or retracted approximately halfway and has practically reached its maximum speed, the diversion finger is located at the end of its swinging out or extension movement. Only the mass of the gear-unit elements need be braked and accelerated again for the return movement. The piston on the other hand maintains its direction of movement and its speed.

An advantage compared with a normal pusher, i.e. a diversion element which is extended by one stroke of the cylinder and retracted again by the other stroke, is that there are no overshoots at the end of the extension movement of the diversion element. A cylinder displays this overshoot at the end of a stroke through the kinetic energy of the masses involved. The overshoot of the piston is transmitted to the diversion element and can lead to the falling over of relatively labile items such as bottles. A further advantage is that the piston is at almost its maximum speed when the diversion element is completely extended. The diversion element therefore travels back extremely rapidly.

The gear unit which transmits the piston movement to the diversion element is preferably a coulisse link mechanism, the coulisse being able to be a straight track with a wave in the centre. The cylinder is arranged in longitudinal direction of the coulisse and the end of the piston rod drives a sliding block or a roller in the coulisse. The movement is transmitted from the sliding block onto a crank lever via a push rod. The push rod lies approximately across the coulisse and the crank lever is swivelled to and fro by it only by approximately 20°. The free lever arm of the crank lever is the diversion element or the diversion finger. With standard 0.75-1 or 1-1 drinks bottles, a sufficient extension path of approximately 1 cm is produced. The extension or swivelling out movement of the diversion finger can be harmonized very well with the conditions of transport and of the diversion process of drinks bottles. The delay due to the breaking-away of the piston and the high transmission ratio of the coulisse link mechanism lead to an initially relatively slow acceleration. This can be balanced by a corresponding anticipatory control. The diversion finger then gains speed rapidly over the coulisse link mechanism, is braked again when the sliding block is located at the vertex of the wave, and travels back extremely rapidly because the cylinder has then reached its full end speed. In the end position, an overshoot of the cylinder is harmless, as the latter has no effect on the diversion finger because of the high transmission ratio.

The conversion of an extension stroke or a retraction stroke of a cylinder into a complete diversion movement, i.e. the extension movement and the retraction movement of the diversion finger or other diversion element, is also possible by means of a scissors mechanism, a toggle lever or a crank drive.

The cylinder can be arranged vertically downwards, which has the advantage that the structure is very space-saving depthwise. However, it can also be arranged rearwards so that the diversion device is very flat. If the cylinder is arranged downwards, a small difference may result between retraction stroke and extension stroke of the cylinder, as gravity contributes to the downward movement. This can be avoided by providing compressed-air supplies with different pressures for the two directions of travel. Instead of one five-/two-way valve, triggering can be e.g. by two three-/two-way valves via various pressure sources. The control times or the travel time of the cylinder can be further accelerated by not switching over these individual valves in direct sequence, but relieving the cylinder earlier on one side by a premature venting (anticipatory control time) so that the breaking-away process is made easier during start-up.

Furthermore, the travelling speed of the cylinder can be increased by providing the control valves in duplicate and placing them directly onto the cylinder, so that the air ways are kept short. This means that two solenoid valves are placed directly at both one and the other cylinder end, which are triggered simultaneously and ensure an increased supply of compressed air and swifter venting.

Preferably, the crank lever and the diversion finger swivel about a horizontal axis which lies approximately parallel to the direction of transport, and at the same time the end of the diversion finger moves from top to bottom during diversion. This is particularly advantageous because the vertical force component acts favourably on the stability of the bottles; the bottles are so to speak pressed onto the base.

Naturally, the swivelling axis of the diversion finger can also be set in any other direction, e.g. upwards, or with lateral diversion. However, diversion by an upward swivelling of the diversion finger in particular is not so stable and leads to increased falling over of the bottles.

By setting the swivelling axis laterally, i.e. across the direction of transport, the diversion finger imparts an additional speed component in the direction of transport to a bottle during the diversion process.

Preferably, the crank lever is developed such that both lever arms, one of which is connected to the push rod and the other, free lever arm, is the diversion finger, are mounted in rotation-resistant manner on a shaft, at a distance from each other. The whole mechanism comprising cylinder, coulisse, push rod and first lever arm of the crank lever can thereby be encapsulated in a housing. On one side, only the shaft is extended, and the diversion finger is mounted at the end of the shaft. The diversion device can be cleaned easily because of this almost complete encapsulation. This is important in operations in the food industry. On a purely functional level, it would also be possible to drive the diversion finger, not via a shaft but as part of a scissors mechanism. However, the whole mechanism would then lie open and cleaning would be made much more difficult.

In a toggle-lever gear unit, the toggle lever is arranged between a housing-fixed fulcrum and the diversion finger or the crank lever, and the pneumatic cylinder acts on the joint of the toggle lever.

Instead of a pneumatic cylinder, a magnetic coil with movable armature can also be used as drive apparatus travelling to and fro. The armature can be moved to and fro between two magnetic coils, the movement, similar to that of the piston, being transmitted to the diversion element by means of a coulisse or toggle lever.

If a stepped motor swinging to and fro is used as drive apparatus, a crank drive is expediently used for the transmission of the movement.

With the diversion device according to the invention, the strength of the diversion impulse can also be controlled, which makes it possible to knock the containers selectively onto one of two or more conveyors running beside the original conveyor. For this, the control system is designed such that the valves can be supplied from various pressure sources so that the cylinder is optionally operated e.g. at 3 or at 5 bar, which affects the travelling speed of the piston, the extension or swivelling out speed of the diversion element and thus the strength of the diversion impulse and the ejection width of the individual containers.

Figure 7:
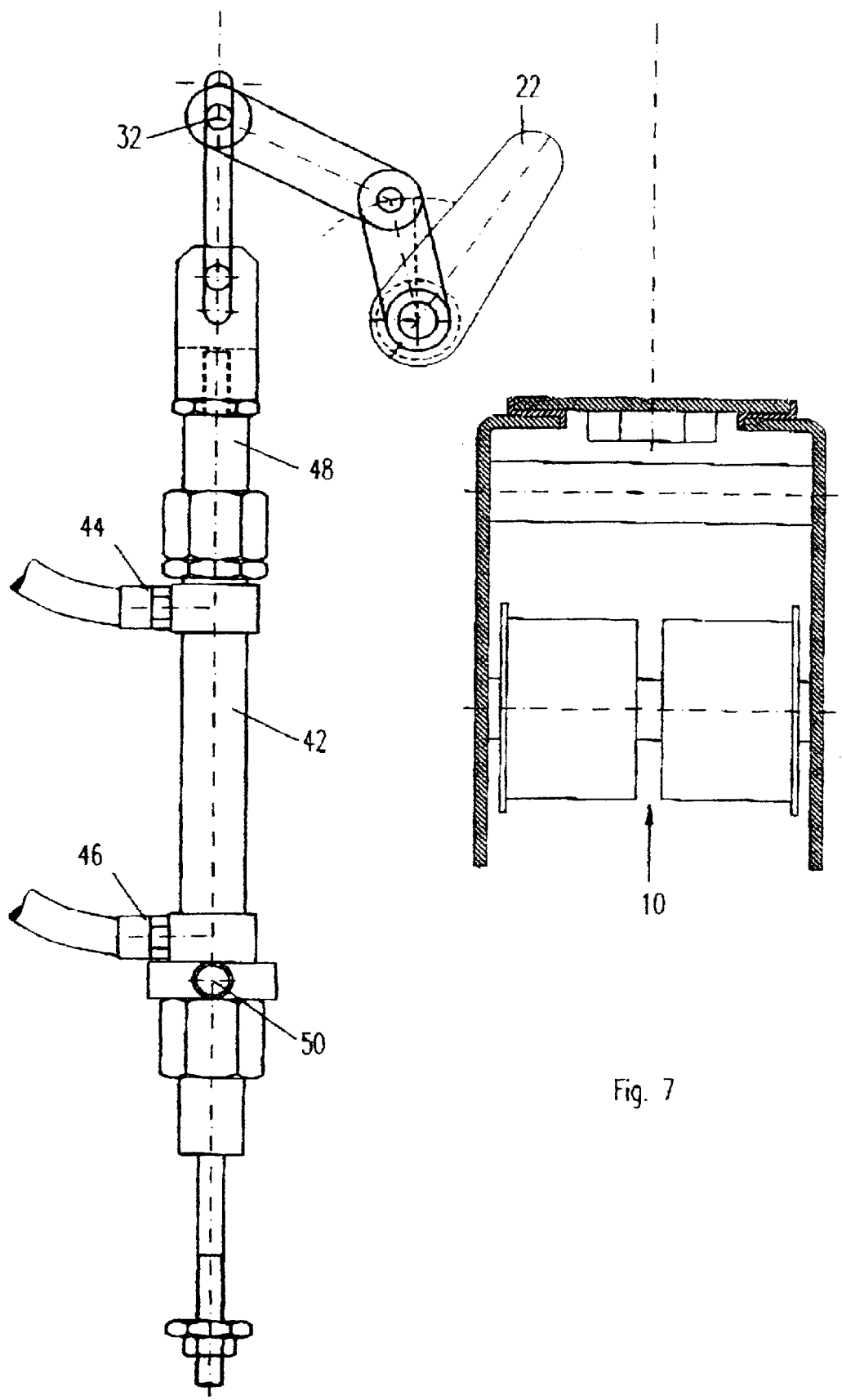
Figure 8:
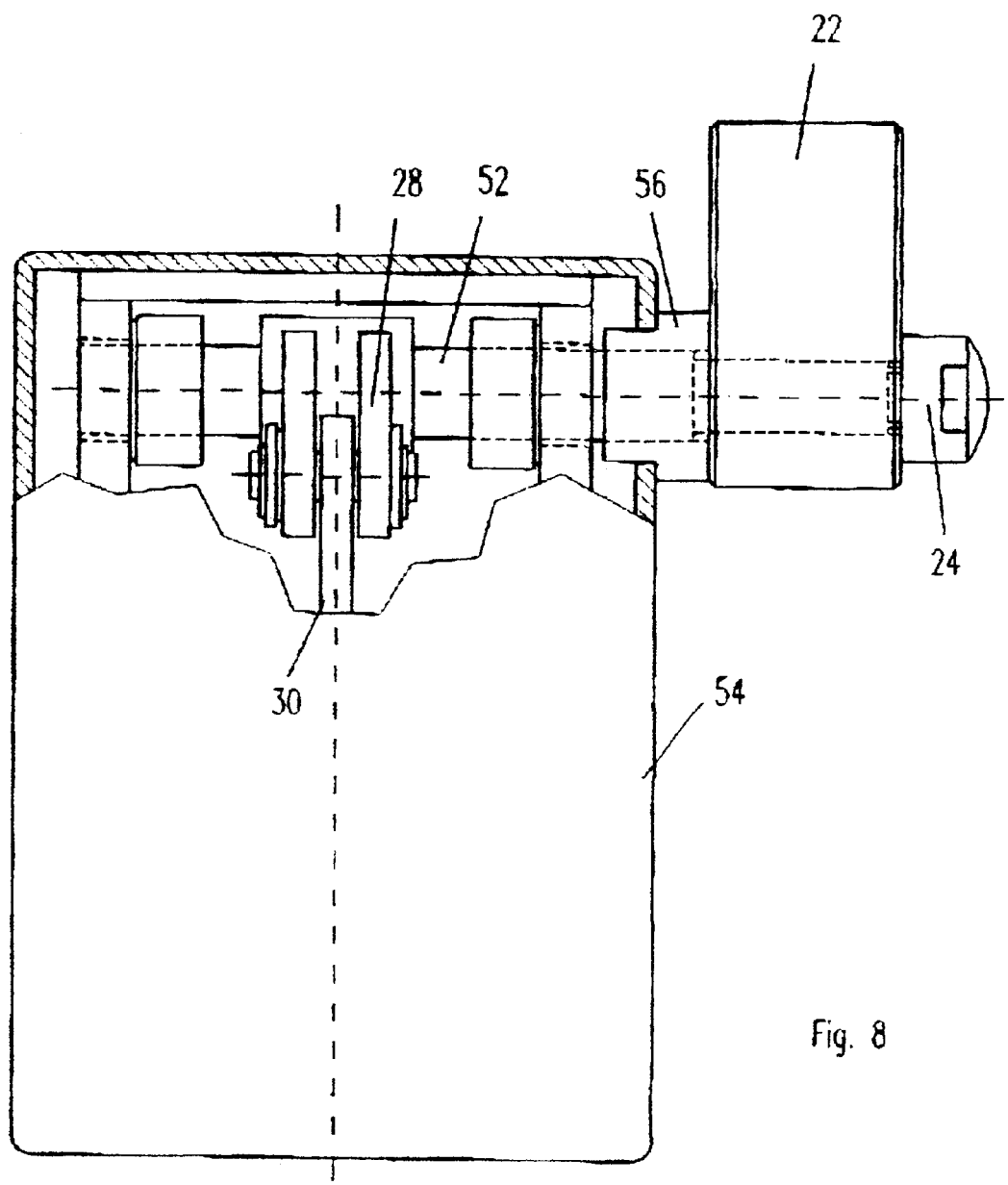
Figure 9:
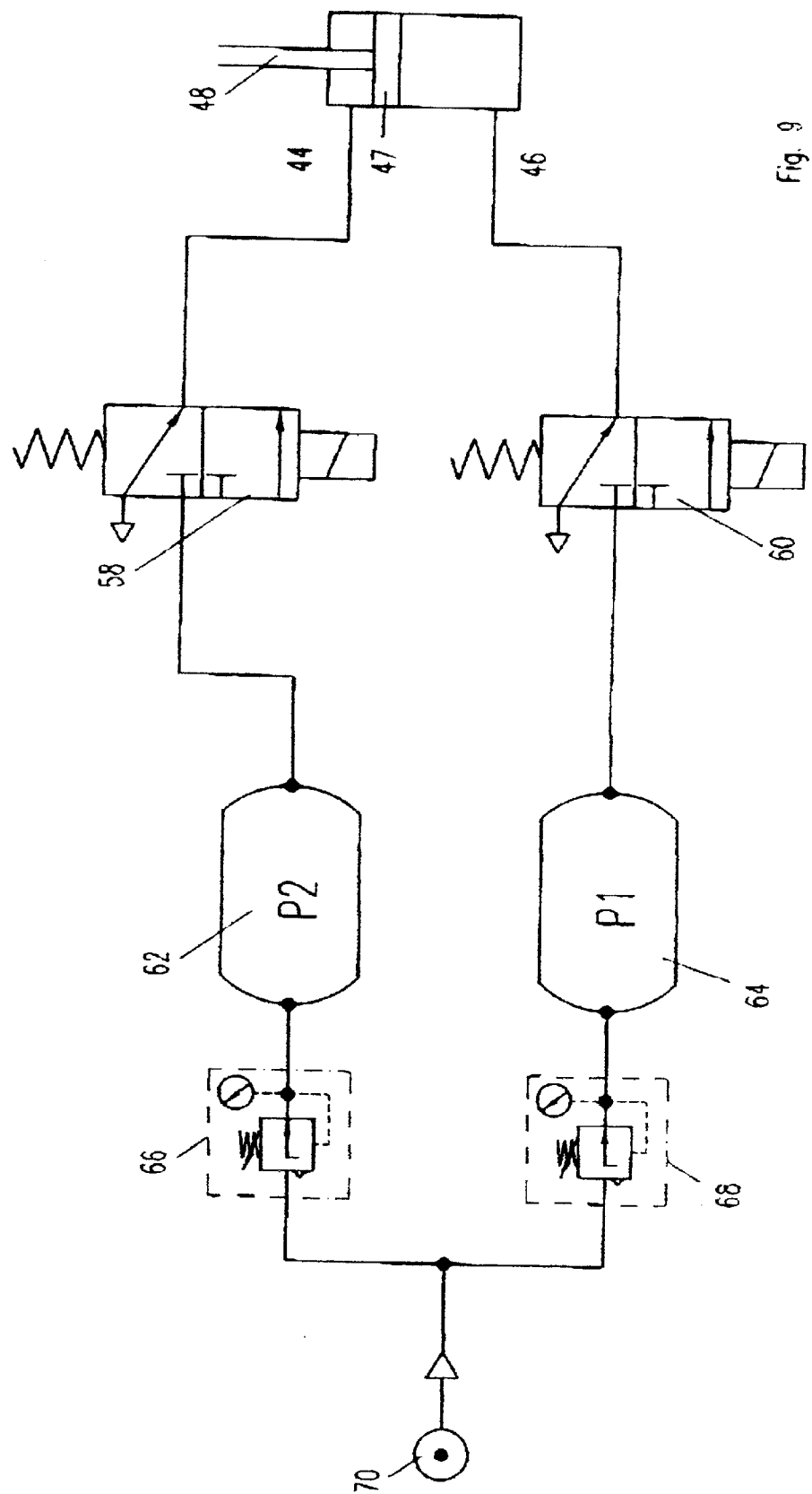
Figure 10:
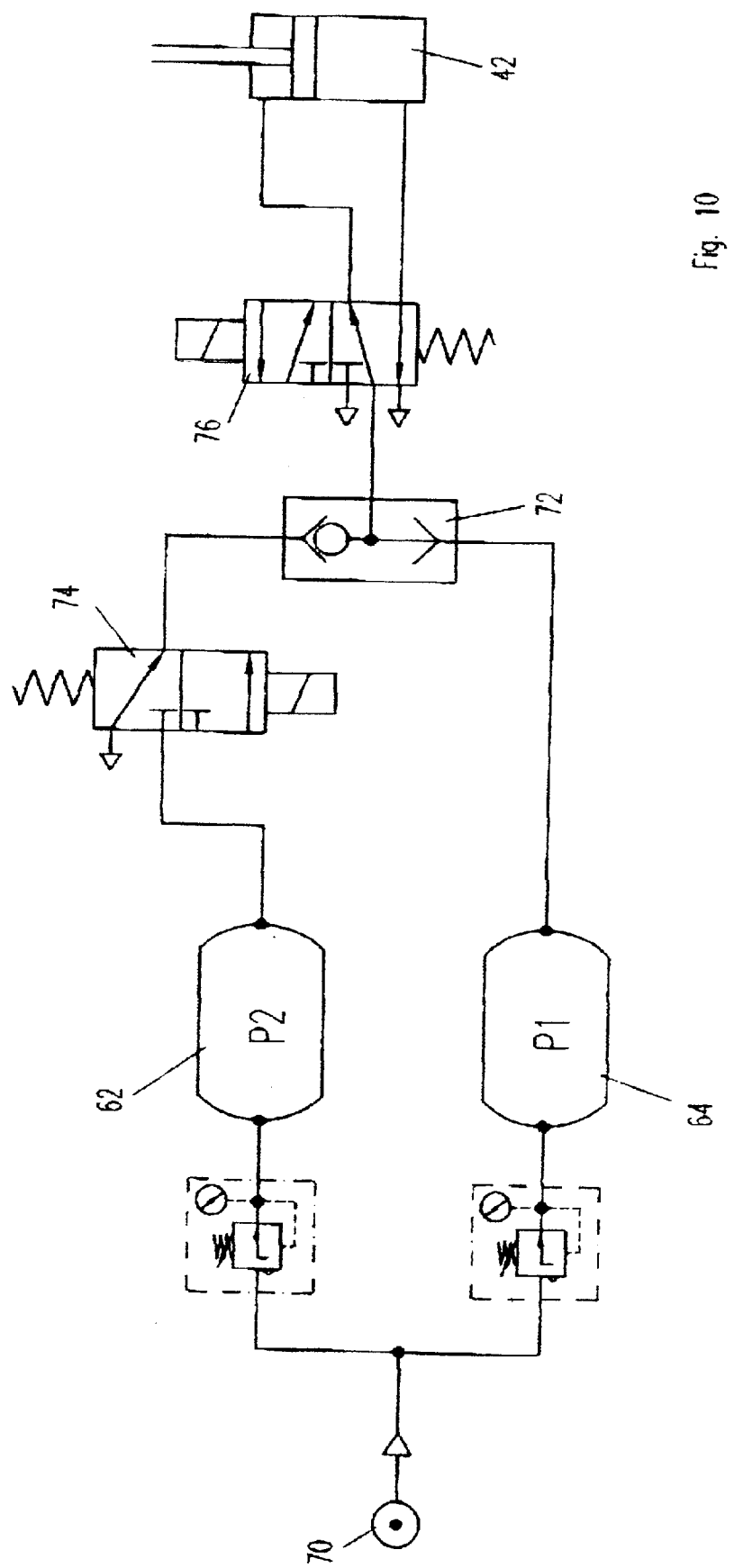
Figure 11:
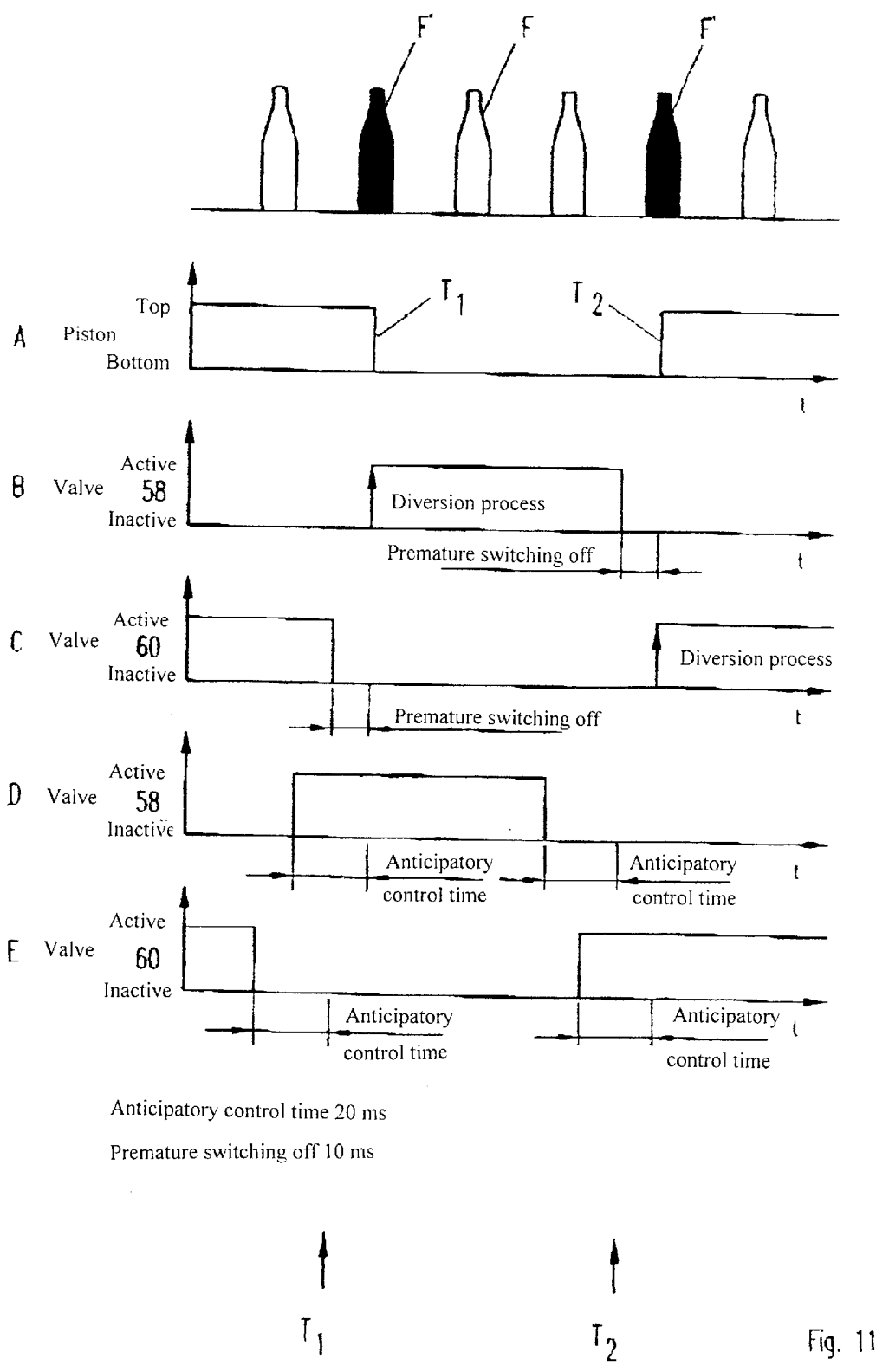
Figure 12:
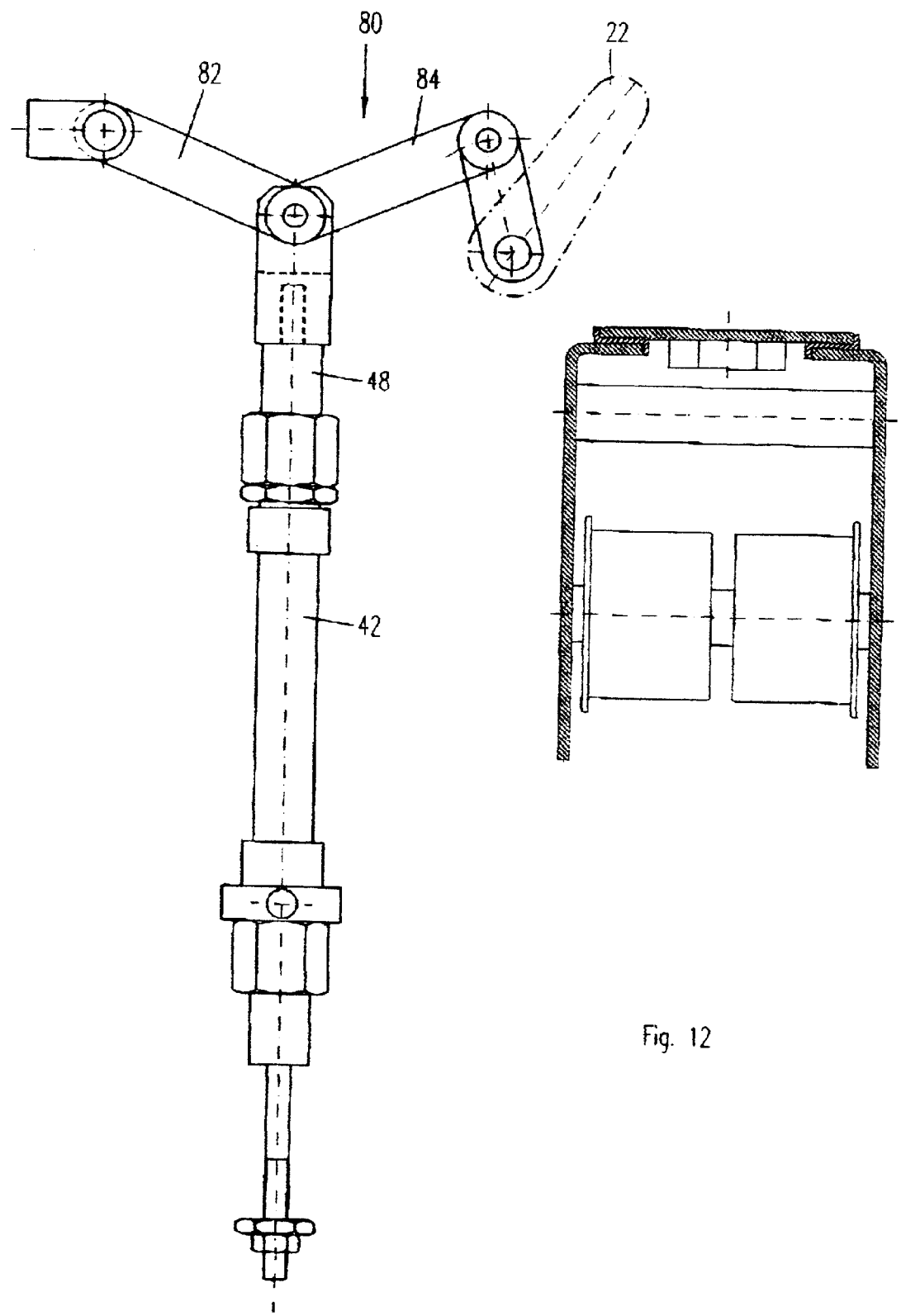
Figure 13:
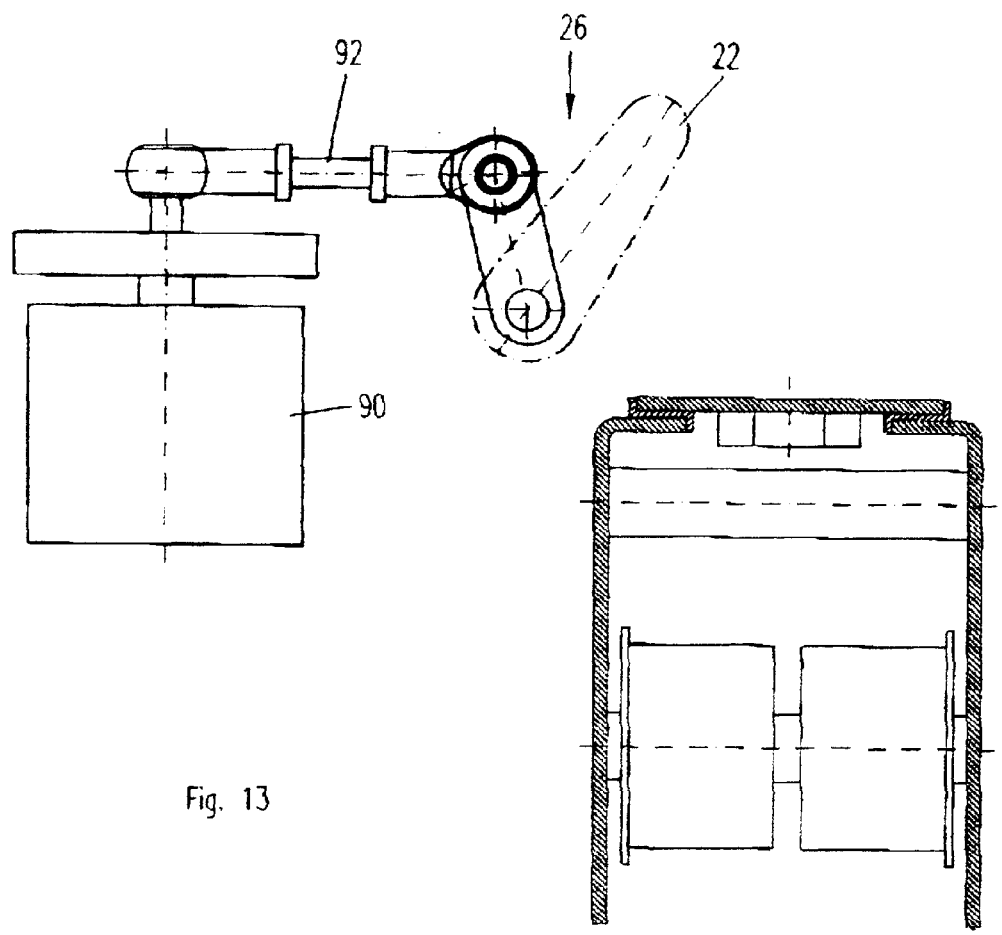
Figure 14:
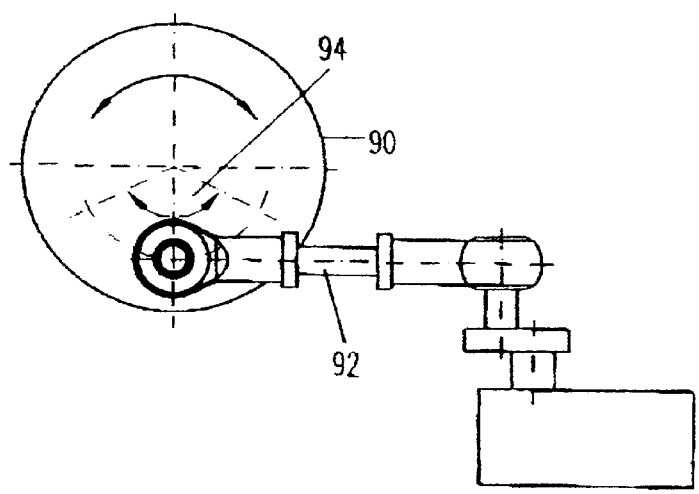

An embodiment of the invention is explained in more detail hereafter by means of the drawing. There are shown in:

FIG. 1 in a three-dimensional representation, three parallel conveyors and a diversion device arranged alongside;

FIGS. 2 to 6 in a vertical section, schematically, various stages of the movement pattern of the diversion device;

FIG. 7 the drive element in the form of a pneumatic cylinder and the diversion finger operated by it via levers;

FIG. 8 in a top view, the shaft on which the diversion finger is housed;

FIG. 9 the compressed-air supply of the pneumatic cylinder;

FIG. 10 a different circuit for the compressed-air supply of the pneumatic cylinder;

FIG. 11 a time diagram of the control system;

FIG. 12 a version of the diversion device with toggle lever for transmission of the movement and FIGS. 13 and 14 a version with a stepped motor as drive apparatus.

FIG. 1 shows a section of a transport apparatus 10 for drink bottles F. The transport apparatus 10 is composed of three conveyors 11, 12, 13 running parallel alongside each other and in the same horizontal plane, which are link-chain conveyors and run at approximately the same speed in the direction of the arrow 14. The bottles F are introduced on the conveyor 11 lying on the right. They have previously been examined by an inspection device, not shown, for foreign bodies, fault-free aperture, fill level or similar.

The bottles F' recognized as defective or non-standard are pushed or knocked by a diversion device 20 mounted beside the transport apparatus 10 from the right-hand conveyor 11 onto the central conveyor 12 running alongside it. For this, the diversion device 20 has a diversion finger 22 which is swivellable about a horizontal axis 24 (FIG. 8). The axis 24 lies parallel to the direction of transport, indicated by the arrow 14, of the conveyors 11, 12, 13. In its at-rest position shown in FIG. 1, the diversion finger 22 is located outside the route of the drinks bottles F. The diversion finger 22 is triggered by the inspection device in precise time-controlled manner and taking account of the transport time from the inspection device to the diversion device 20, so that it swivels at the moment when a drinks bottle F' recognized as defective is in front of it. The swivelling movement is very rapid and the diversion finger 22 imparts only a short knock or movement impulse to the drinks bottle F' to be diverted, sufficient for the drinks bottle F' to slide from the right-hand conveyor 11 onto the central conveyor 12. The drinks bottles F' in FIG. 1 have been knocked in this manner from the right-hand conveyor 11 onto the central conveyor 12.

Figure 2:
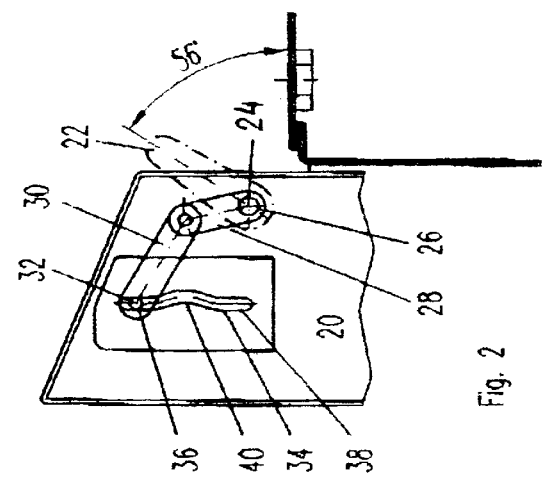
Figure 5:
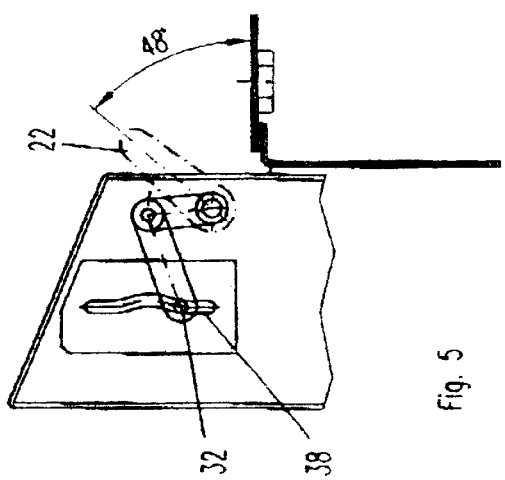

As can be seen in FIG. 2, the diversion finger 22 is one lever arm of a crank lever 26 which is swivellable about the axis 24. The end of the other lever arm or crank arm 28 is connected to the front end of a push rod 30 the rear end of which is guided in a coulisse 34 by means of a sliding block 32. The sliding block 32 is designed as a roller. The coulisse 34 is aligned essentially vertically and lies behind the axis 24 at a distance corresponding approximately to the length of the push rod 30. The centre of the coulisse 34 lies above the axis 24 by approximately the length of the crank arm 28. When the sliding block 32 is in the centre of the coulisse 34, the push rod 30 lies approximately horizontal and the crank lever 28 approximately vertical.

The coulisse 34 has three sections. An upper and a lower straight section 36 and 38 respectively and a central section which has the form of a wave 40 directed towards the axis 24. Upon a movement of the sliding block 32 in the coulisse 34 from the top down or from the bottom up, the crank lever 26, and thus also the diversion finger 22, is thereby swivelled to and fro by a specific angle.

A drinks bottle F' passing precisely before the diversion finger 22 at this moment receives a knock and slips onto the central conveyor 12 because of the imparted movement impulse.

Figure 4:
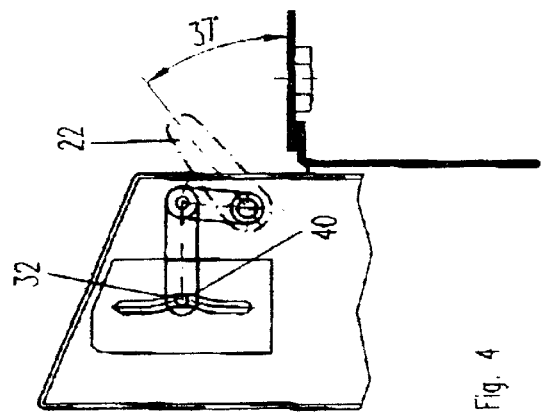
Figure 3:
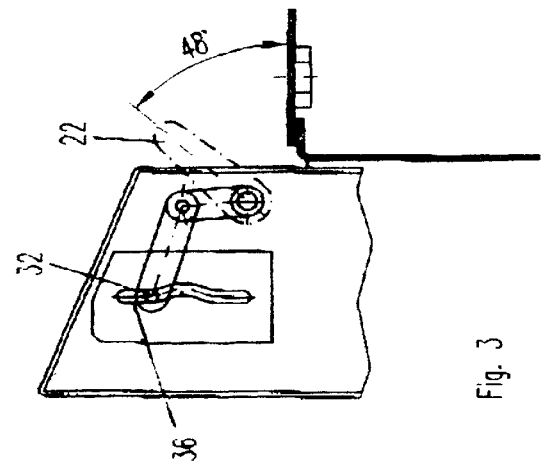
Figure 6:
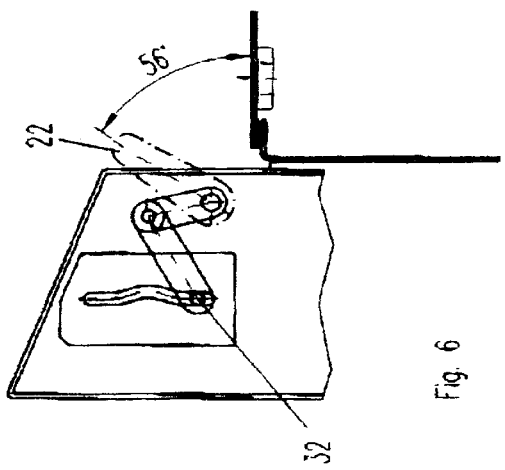

FIGS. 2 to 6 show in detail how the diversion finger 22 is swung in and out by a single stroke movement of the sliding block 32 from the top down. As long as the sliding block 32 is located in the upper straight section 36 (FIG. 3), the diversion finger 22 moves relatively slowly out of its initial position, in which it is aligned at an angle of approximately 56° to the horizontal, into a position of 48°. Through the further movement of the sliding block 32 on the short route to the vertex of the wave 40, the diversion finger 32 on the other hand is swivelled out to an angle position of approximately 37° vis-a-vis the horizontal (FIG. 4). After the vertex of the wave 40 has been passed, the diversion finger 22 is firstly swivelled back rapidly into an angle position of approximately 48° (FIG. 5) and then slowly back into the initial position of 56° (FIG. 6) during the movement of the sliding block 32 in the lower straight section 38.

The swivelling in and out of the diversion finger 22 proceeds approximately as a mirror image to the centre of the movement course in which the sliding block 32 is located in the vertex of the wave 40. At the same time this means that the swivelling in and out movement of the diversion finger 22 is the same during a movement of the sliding block 32 from the bottom up as during a movement of the sliding block 32 from the top down.

FIG. 7 shows a pneumatic cylinder 42 for the drive of the diversion device 20. The pneumatic cylinder 42 has an upper and lower connection 44 and 46 for compressed air in order to push the piston downwards or upwards respectively. A piston rod 48 is extended upwards out of the pneumatic cylinder 42. The sliding block 32 is hinged to the end of a piston rod 48. In FIG. 7, the coulisse 34 is not drawn in, and the transport apparatus 10 is shown with only one conveyor. The pneumatic cylinder 42 is suspended at the lower end rotatable about an axis 50, so that it can follow the position of the sliding block 32 when this passes through the coulisse 34. The axis 50 lies parallel to the axis 24 of the crank lever 26.

FIG. 8 shows in top view the housing of the crank lever 26. The diversion finger 22 and the crank arm 28 are mounted in rotation-resistant manner on a shaft 52 at a distance from each other. The crank arm 28 is bifurcated. The whole diversion device 20 is housed in a closed housing 54 and only the end of the shaft 52 with the diversion finger 22 mounted on it is extended from the housing 54 by means of a bearing bush 56.

The piston 47 is braked by its own weight and the weight of the piston rod 48 and of the sliding block 32 upon an upward movement and accelerated upon a downward movement. With the compressed-air supply shown in FIG. 9, the upper and lower connections 44, 46 of the pneumatic cylinder 42 are therefore connected via individual control valves 58, 60 to separate compressed-air reservoirs 62, 64, which can be charged at different pressures by a joint compressed-air source 70 via adjustable pressure regulators 66. The control valves 58, 60 are three-/two-way valves. The upper connection 44 is supplied at a pressure of 3 bar and the lower connection at a pressure of 3.5 bar. The control valves 58, 60 are actuated magnetically and are placed directly onto the connections 44, 46 in order to shorten the reaction time of the pneumatic cylinder 42.

FIG. 10 shows a circuit for supplying the two connections 44, 46 at different pressures. The speed of the piston 47 can be controlled thereby. A pressure of 3 or 5 bar can optionally be supplied via each of the connections 44, 46. For this, the pressure in the compressed-air reservoirs 62, 64 is set at 5 and 3 bar respectively and a valve 72, which contains two non-return valves arranged opposite each other with an outlet lying between them, is connected to both compressed-air reservoirs 62, 64 each of which passes on the higher pressure value. A control valve 74 is arranged between the compressed-air reservoir 62 with the higher pressure of 5 bar and the valve 72, so that this line can be blocked. The outlet of the valve 72 is guided via a switch valve 76 to the double-action pneumatic cylinder 42. Through the switch valve 76, one of the two sides of the pneumatic cylinder 42 can optionally be pressurized and the other side in each case ventilated.

FIG. 11 shows the time diagram of the control system of the pneumatic cylinder 42 in the embodiment of FIG. 9. The bottles F represented with a white interior are fault-free and are to remain on the original conveyor 11, whereas the bottles F' represented in solid black have been recognized as defective in an inspection apparatus and are to be diverted.

The first line A shows the position of the piston 47, and the second and third lines B and C respectively show the status of the valves 58 and 60. The piston is located at the top at the start and the first control valve 58 is inactive, i.e. the space above the piston is ventilated, whilst the second control valve 60 is active. The first bottle F' is to be diverted at the time $T_1$. Already approximately 10 ms before the time $T_1$, the second control valve 60 is switched to inactive in order to ventilate the lower cylinder chamber and thereby facilitate the breaking-away of the piston 47. At the time $T_1$, the first control valve 58 is then switched to active whereby the upper cylinder chamber is pressurized, the piston 47 moves downwards and the diversion finger 22 is extended and retracted. The switching status of the control valves 58, 60 remains unchanged until shortly before the time $T_2$ at which the second bottle F' is to be diverted. Approximately 10 ms before the time $T_2$, the first control valve 58 is switched to inactive in order to ventilate the upper cylinder chamber and to thereby facilitate the breaking-away of the piston 47. At the time $T_2$, the first control valve 60 is switched to active, whereby the lower cylinder chamber is now pressurized, the piston 47 moves upwards and the diversion finger 22 is extended and retracted.

The lines D and E of FIG. 11 show an embodiment in which an anticipatory control time of 20 ms is used in order to balance the response inertia of the system. The previously active control valve 58 or 60 is switched to inactive approximately 30 ms before the time $T_1$ or $T_2$ respectively in order to ventilate the upper or lower cylinder chamber respectively and the other control valve 60 or 58 is switched to active approximately 20 ms before the time $T_1$ or $T_2$ FIG. 12 shows an embodiment with a toggle lever 80 as gear unit. One lever 82 is hinged to a housing-fixed point and the other lever 84 is hinged to the crank arm 28. The piston rod 48 of the pneumatic cylinder 42 is connected to the joint of the toggle lever 80. In FIG. 12, the pneumatic cylinder 42 is shown in its retracted position. Upon an extension stroke of the pneumatic cylinder 42, the piston 47 moves upwards out of this position, so that the toggle lever 80 is extended. The diversion finger 22 has then reached its completely extended position. The piston 47 is driven further upwards by the applied pressure until it has reached its upper end position, in which the toggle lever 80 is deflected by the same angle as shown in FIG. 12, but upwards. The diversion finger 22 is then retracted again. Upon the next diversion process, the piston 47 travels downwards again, the diversion finger 22 then carrying out a complete diversion movement, i.e. extending and retracting. Although the chronological movement course of the diversion finger 22 is largely pre-set by the toggle-lever kinematics, the extension movement of the diversion finger 22 can be adjusted by a relatively small acceleration of the piston 47 such that the bottles are gently struck here also and diverted. The retraction movement of the diversion finger 22 is very rapid as the piston 47 has then reached its maximum speed.

FIGS. 13 and 14 show in side view and top view respectively a version with a stepped motor 90 as drive. Here, too, the diversion finger 22 is part of the crank lever 26. The crank arm 28 is connected 30 by means of a universal joint to the push rod, the other end of which is likewise connected by means of a universal joint to a crank 92 which is attached to the shaft of the stepped motor 90. The stepped motor 90 is controlled such that it moves to and fro only in the angle range 94. In FIGS. 13 and 14, the stepped motor travels through precisely the central position of this angle range 94 at high speed, so that the diversion finger 22 has reached its completely extended position. By using a stepped motor, the movement course of the diversion finger 22 can be controlled exactly and within very wide limits.

List of reference numbers

| | |
|---|---|
| 10 | transport apparatus |
| 11 | right-hand conveyor |
| 12 | central conveyor |
| 13 | left-hand conveyor |
| 14 | arrow |
| 20 | diversion device |
| 22 | diversion finger |
| 24 | axis |
| 26 | crank lever |
| 28 | crank arm |
| 30 | push rod |
| 32 | sliding block |
| 34 | coulisse |
| 36 | upper section |
| 38 | lower section |
| 40 | wave |
| 42 | pneumatic cylinder |
| 44, 46 | connection |
| 47 | piston |
| 48 | piston rod |
| 50 | axis |
| 52 | shaft |
| 54 | housing |
| 56 | bearing bush |
| 58, 60 | control valves |
| 62, 64 | compressed-air reservoirs |
| 66, 68 | pressure-adjustment valves |
| 70 | compressed-air source |
| 72 | valve |
| 74 | control valve |
| 76 | switch valve |
| 80 | toggle lever |
| 82, 84 | lever arms |
| 90 | stepped motor |
| 92 | crank |
| 94 | angle range |

What is claimed is:

1. An apparatus for diverting an item from a stream of items which are conveyed on a transport apparatus, comprising:
    an extendable and retractable diversion element imparting a cross impulse to the item to be diverted so that the item slides from the transport apparatus across the direction of transport, characterized in that the diversion element moves from top to bottom exerting a vertical force component upon the item to be diverted;
    a drive means having a full swing, the lull swing portioned into two half swings, the drive means powers a gear unit that actuates the diversion element such that the diversion element completes a full cycle of extension and retraction for every half swing of the drive means.

2. The apparatus according to claim 1, wherein the drive means having a full swing is a pneumatic cylinder and the gear unit transmits a piston movement to the diversion element by a coulisse link mechanism or a toggle lever.

3. The apparatus according to claim 2, wherein the coulisse link mechanism is a straight track containing a wave therein.

4. The apparatus according to claim 3, wherein the cylinder is arranged in a longitudinal direction relative to the track.

5. The apparatus according to claim 3, wherein the cylinder is arranged across the toggle lever.

6. The apparatus according to claim 3, wherein the movement of the piston is transmitted by the gear unit to a crank lever, a free lever arm of the crank lever is the diversion element.

7. The apparatus according to claim 6, wherein the sliding block is connected to the crank lever via a push rod and the push rod lies approximately across the track.

8. The apparatus according to claim 1, wherein the drive means is a stepped motor coupled to the diversion element via a crank mechanism.

9. An apparatus for diverting an item from a stream of items, comprising:
    a plurality of conveyors transporting the stream of items, the conveyers aligned parallel to one another and conveying items in a common direction;
    an extendable and retractable diversion element imparting a force on an item to be diverted so that the item to be diverted shifts laterally within the plurality of conveyors, the force on the item to be diverted has a vertical force component such that the diversion element strikes the item to be diverted from near a top of the item toward a bottom of the item;
    a pneumatic cylinder having a full swing, the full swing portioned into two half swings, the pneumatic cylinder powers a gear unit, the gear unit actuates the diversion element such that the diversion element completes a full cycle of extension and retraction for every half swing of the pneumatic cylinder.

10. An apparatus for diverting an item from a stream of items, comprising:
    a plurality of conveyors transporting the stream of items, the conveyers aligned parallel to one another and conveying items in a common direction;
    an extendable and retractable diversion element imparting a force on an item to be diverted so that the item to be diverted shifts laterally within the plurality of conveyors, the force on the item to be diverted has a vertical force component such that the diversion element strikes the item to be diverted from near a top of the item toward a bottom of the item;
    a stepped motor having a full cycle, the full cycle portioned into two half cycles, the stepped motor powers a crank mechanism, the crank mechanism actuates the diversion element such that the diversion element completes a full cycle of extension and retraction for every half cycle of the stepped motor.

* * * * *